March 8, 1927. 1,619,823
K. KLEIN
MOTOR VEHICLE
Filed July 6, 1925   2 Sheets-Sheet 1
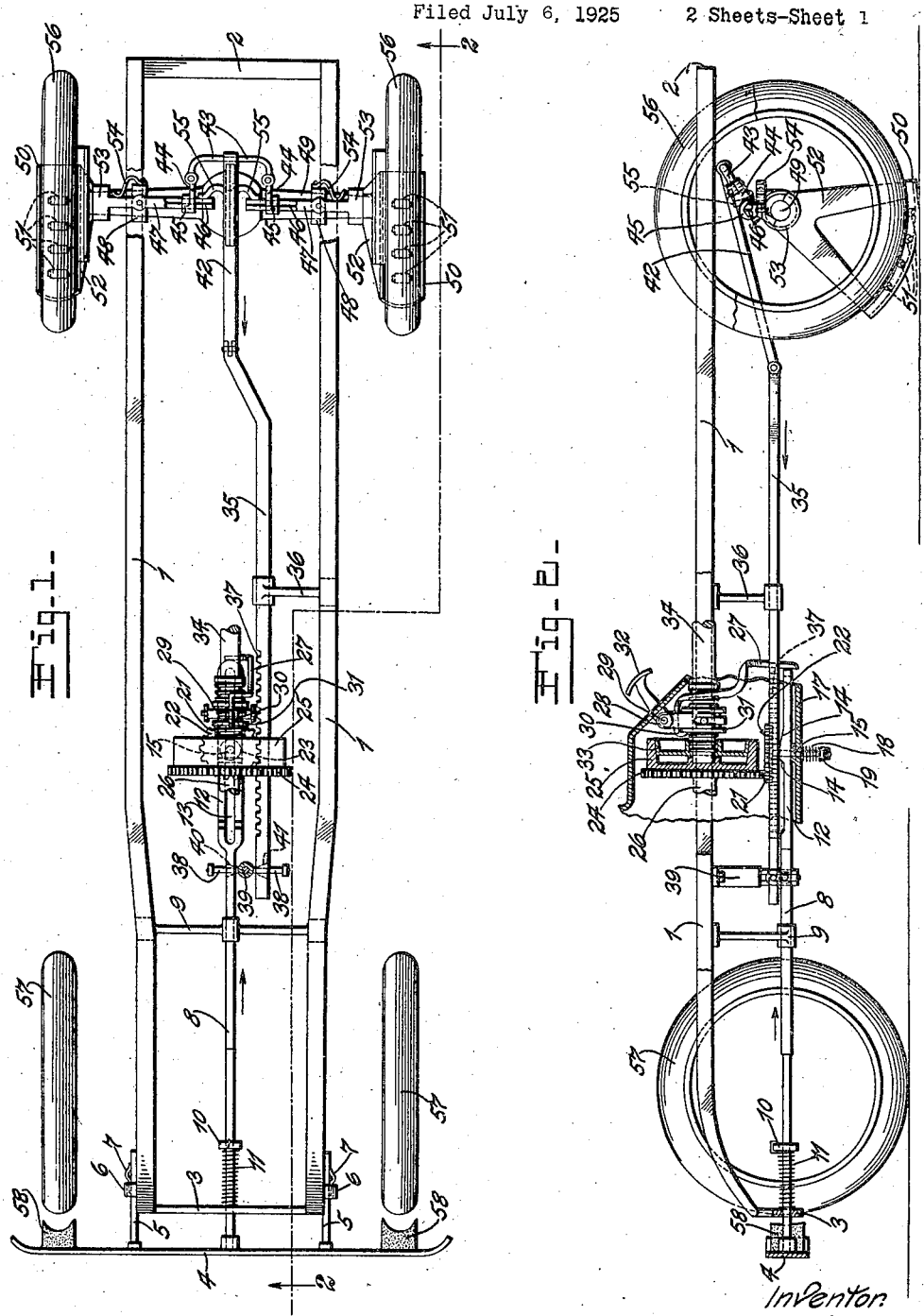

March 8, 1927. 1,619,823
K. KLEIN
MOTOR VEHICLE
Filed July 6, 1925    2 Sheets-Sheet 2
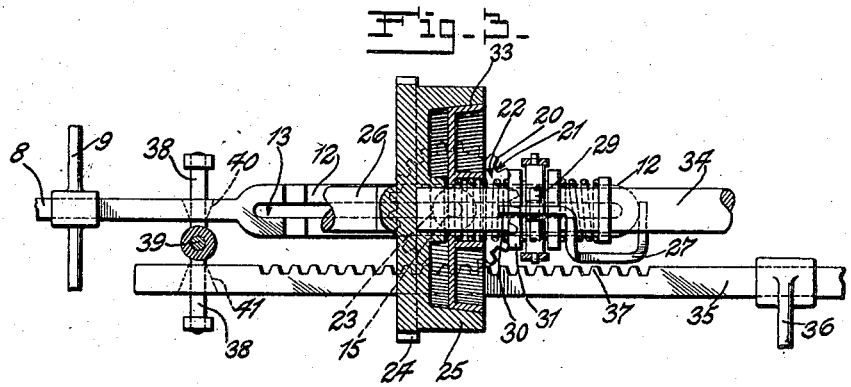
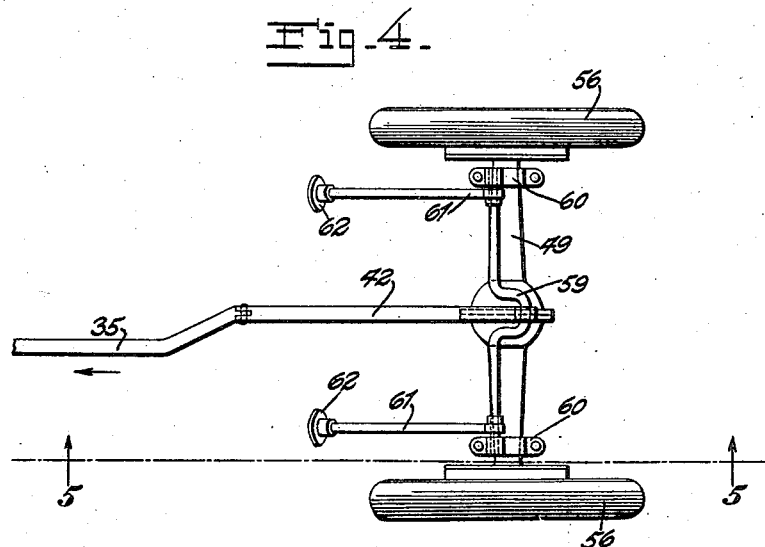
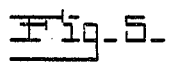
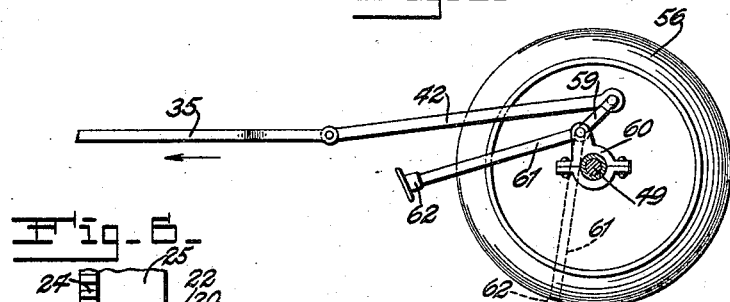
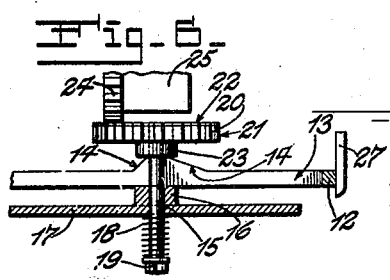
Inventor:
Karl Klein,
His Attorneys.

Patented Mar. 8, 1927.

1,619,823

UNITED STATES PATENT OFFICE.

KARL KLEIN, OF ST. LOUIS, MISSOURI.

MOTOR VEHICLE.

Application filed July 6, 1925. Serial No. 41,560.

This invention relates to improvements in motor vehicles, and consists in the novel construction hereinafter disclosed.

An object of the invention is to provide in connection with a motor vehicle an automatic device for stopping the motor vehicle, said device being actuated by a bumper bar arranged tranversely of the chassis of the vehicle, said device being operable to lock the vehicle against forward movement when the bumper bar comes in contact with an object.

Another object of the invention is to provide in a device of the class described means for locking the wheels of the vehicle and, as an incident to the locking adjustment of the device, means for throwing out the clutch.

Additional advantages will appear from the following detailed description of the invention taken in connection with the accompanying drawings, in which—

Fig. 1 is a plan view of a motor vehicle chassis in which the device of the invention is incorporated.

Fig. 2 is a vertical section on the line 2—2 of Fig. 1.

Fig. 3 is a detail view of a part of the actuating mechanism for the device.

Figs. 4 and 5 are, respectively, a plan and an elevation of a modification of the means for rendering the rear wheels of the vehicle inoperative.

Fig. 6 is a detail view of a portion of the actuating device.

In the embodiment of the invention illustrated in the drawing the device is shown as incorporated in the chassis of a motor vehicle comprising longitudinal side members 1, a transverse rear frame member 2 and a front frame member 3. A bumper bar 4 is disposed transversely of the front of the vehicle and has extending rearwardly at right angles thereto bars 5 which operate in supports 6, the supports 6 being in the form of U-shaped members attached to the sides of the frame members of the vehicle.

The bars 5 carry leaf springs 7, the function of which is to normally hold the bars 5 extended outwardly. That is to say, the springs 7 in normal adjustment of the device lie forward of the members 6 and frictionally hold the entire bumper bar forward. The springs are adapted to ride against the inner portion of the U-shaped member 6 so that when any abnormal pressure is exerted the bumper bar will be pressed downwardly and the bars 5 may move backwardly of the side members of the frame of the vehicle.

In Fig. 1 of the drawing the bars 5 are shown in a position rearwardly of the normal adjustment. A central rod 8 is attached at its forward end to the bumper bar 4 intermediate of its ends, said rod 8 passing through and being supported by the member 3 and by a transverse support 9. The rod 8 is euipped with a collar 10 and between the collar 10 and the inner face of the member 3 is an expansion spring 11. Thus after the initial pressure has been exerted against the bumper bar and the springs 7 forced through the supports 6, the expansion spring 11 operates to complete the endwise motion of the rod 8 rearwardly of the frame of the vehicle. The rod 8 has an enlargement 12 at its rearward end in which there is a longitudinal slot 13, the upper face of the enlargement 12 having a cam shoulder 14.

A stud shaft 15 is mounted in a hollow boss 16 formed on the inner face of the clutch housing 17 of the motor vehicle. The support for the stud shaft 15 is in such position that the stud shaft extends vertically into the space forming the slot 13. An expansion spring 18 operating against the lower face of the housing 17 and against a washer 19 on the lower end of the stud shaft 15 tends to depress the stud shaft. At the upper end of the stud shaft 15 is a loosely mounted gear 20 having gear teeth 21 on its periphery, and a marginal frictional surface 22 on its upper face adjacent to the periphery. Below the lower face of the gear 20 is a collar 23 keyed on the shaft 15. Thus by particular reference to Fig. 6 it will be observed that when initial rearward movement has been imparted to the rod 8 the cam shoulder 14 actuates the shaft 15 upwardly to the position shown in Fig. 6. In this position the frictional marginal surface 22 is brought into contact with a toothed ring 24 on the fly wheel member 25 of the clutch device of the vehicle, said fly wheel member being rigid with the drive shaft 26 driven from the engine. Thus once the rod 8 has been given its initial rearward movement a brake against the fly wheel of the drive shaft is set.

Continued rearward movement of the rod 8 brings the rear end thereof into contact with the tail of a lever 27, said lever 27 being pivoted upon a bracket 28 supported upon the clutch lever rod 29. The forward end of the lever 27 has a hook 30 that engages against the forward face of the collar 31 of the clutch device which is normally operated by the clutch lever 32 in the usual manner.

Thus it will be observed that the lever 27 acts as a supplemental clutch throw-out device that operates to disengage the internal clutch member 33 from the fly wheel clutch member 25 when the rod 8 has reached its limit of rearward movement. Obviously when the clutch is disengaged the drive shaft is disconnected from the power transmission shaft 34.

In parallel alinement with the rod 8 is a rod 35 supported for longitudinal movement in a bracket 36 extending inwardly from one end of the side members 1 of the frame of the vehicle. The rod 35 has a rack 37 near its forward end, said rack meshing with the gear teeth 21 of the gear 20. The forward end of the rod 35 is connected with the rod 8 by a lever 38 pivoted at 39, said lever passing through tapering slots 40 and 41 formed, respectively, in the rod 8 and the rod 35. Thus, as the rod 8 is moved rearwardly, the rod 35, through its connections with the rod 8, is moved forwardly. Pivoted to the rear end of the rod 35 is a link 42 that connects with a yoke 43 attached to the rear end of the link 42. The arms of the yoke 43 each has connected therewith a link 44, the forward end of which carries a socket 45 having a polygonal opening therein. The sockets 45 fit over polygonal shaped ends 46 of arms 47, each of said arms 47 being pivoted upon a collar 48 rotatably mounted around the rear axle housing 49 of the vehicle.

The outer ends of each of the arms 47 support a shoe comprising a segmental curved member 50 in the inner part of which is a plurality of transverse rollers 51, said members 50 having webs or supports 52 that connect with hubs 53 carried by the arms 47.

Attached to each of the collars 48 is a leaf spring 54, the free end of which bears against the outer end of each of the arms 47 normally moving the outer ends of said arms forwardly.

The link 42 carries a second yoke 55, the outer extremities of which are arranged to contact with the side faces of the polygonal portions 46 of the arms 47. Thus, when the rod 35 is actuated forwardly the link 42 operates the yoke 43 as a crank arm, swinging the shoes downwardly and at the same time the yoke 55, by bearing against the ends of the arms 47, carries said arms from an oblique angle to a position in axial alinement with the axis of the vehicle rear wheels 56, thus bringing the shoes beneath the lower face of the vehicle wheels so that they are caught by the rollers 51 and raised from the ground surface where they revolve idly without imparting forward movement to the vehicle, and at the same time the outer faces of the members 50 tend to brake the forward movement of the vehicle.

In connection with the setting of the stop device for the rear wheel, provision is made for the braking of the front wheels 57 of the vehicle by frictional shoes 58 carried on the inner face of the bumper member 4, the shoes 58 coming in contact with the tread surface of the front wheels 57 at the same time the shoes 58 are brought into position in connection with the rear wheels.

In Figs. 4 and 5 a modification of the structure has been shown to the extent that the link 42 is connected with a crank arm 59 supported by brackets 60 carried by the rear axle housing 49. The crank arm 59 carries at each end a leg 61, each of said legs having an enlargement 62 at its end. In this construction by the forward movement of the rod 35 the legs 61 are carried downwardly so that the enlargements 62 thereof come in contact with the ground surface and elevate the rear wheels, causing them to idle and at the same time the enlargements 62 form frictional brakes to retard the forward inertia of the vehicle.

From the foregoing description it will be understood that initially when the bumper 4 comes in contact with an object the forward speed of the vehicle is reduced by the brake action against the fly wheel member of the drive shaft; that further rearward motion of the bumper actuates the brake devices for the four wheels of the vehicle and, incident to the operation of the said devices, the clutch of the vehicle is thrown out of engagement. It is clear, therefore, that the construction presents a practical and efficient means for automatically stopping the vehicle within a very short distance, and that the device is immediately put into operation by the contact of the bumper with an object. Inasmuch as the stopping of the vehicle is effected within a short space and practically upon the spot at which contact is made with the bumper, the danger of serious injury either to persons or property is reduced to a minimum.

I am aware that the invention may be modified in certain particulars without departing from the spirit and scope thereof. I do not limit myself therefore to unessential details, but what I claim and desire to secure by Letters Patent is:—

1. In a motor vehicle, the combination of a chassis and an engine supported therein and a clutch device operatively connecting the engine with the rear wheels of the vehicle, of a bumper extending transversely of the chassis and arranged for endwise movement, shoes adapted to be interposed between the ground and the rear wheels to cause said wheels to idle, connections between the shoes and the bumper including an operative device for automatically connecting said means with the engine, operable by frontal contact on the bumper, and a device for releasing the clutch after said shoes have been set.

2. In a motor vehicle, the combination with the engine, and a bumper disposed transversely of the chassis, shoes adapted to be interposed between the ground and the rear wheels, thereby rendering the rear wheels of the vehicle inoperative for propelling the vehicle, connections between the bumper and said shoes adapted to be operatively connected with the engine for completing the operation of said means after initial movement has been imparted thereto by frontal contact against the bumper.

3. In a motor vehicle, the combination with a bumper disposed transversely of the chassis, shoes adapted to be interposed between the ground and the rear wheels, thereby rendering the rear wheels of the vehicle inoperative for propelling the vehicle, connections between said shoes and the bumper for disengaging the clutch of the vehicle, and connections between said means and the motor whereby final movement to said means will be imparted after the movement has been initiated by frontal contact on the bumper.

4. In a motor vehicle the combination with a bumper disposed transversely of the frame, of means for rendering the rear wheels of the vehicle inoperative for propelling the vehicle, connections between the bumper and said means whereby frontal contact on the bumper will operate said means, and means for braking the fly wheel of the vehicle operated as an incident to the movement of said connections.

5. In a motor vehicle the combination with a bumper, of shoes for causing the rear wheels of the vehicle to idle, arms for operating said shoes, said arms having an outward and rotary motion for moving the shoes outwardly beneath the rear wheels, relatively movable rods, one of said rods being connected to the bumper and the other of said rods being operatively connected to move said arms, connections between said rods whereby said rods are moved endwise of each other by pressure on the bumper, and means actuated by said connections for frictionally engaging the fly wheel of the clutch.

6. In a motor vehicle the combination with a bumper, of shoes for causing the rear wheels of the vehicle to idle, arms for operating said shoes, said arms having an outward and rotary motion for moving the shoes outwardly beneath the rear wheels, relatively movable rods, one of said rods being connected to the bumper and the other of said rods being operatively connected to move said arms, connections between said rods whereby said rods are moved endwise of each other by pressure on the bumper, and means operated by said connections for disengaging the clutch.

7. In a motor vehicle the combination with a bumper, of shoes for causing the rear wheels of the vehicle to idle, arms for operating said shoes, said arms having an outward and rotary motion for moving the shoes outwardly beneath the rear wheels, relatively movable rods, one of said rods being connected to the bumper and the other of said rods being operatively connected to move said arms, connections between said rods whereby said rods are moved endwise of each other by pressure on the bumper, means operated by said connections to frictionally engage the fly wheel of the clutch, and means for disengaging the clutch and releasing said frictional means.

8. In a motor vehicle, the combination with a bumper, of shoes for causing the rear wheels of the vehicle to idle, mechanism operatively connected with the motor of the vehicle whereby frontal contact on the bumper will impart initial movement to said mechanism and operatively connect it with the motor for the completion of the rearward movement thereof, thereby setting said shoes in a position to cause the rear wheels to idle.

9. In a motor vehicle, a bumper, shoes for causing the rear wheels of the vehicle to idle, brake devices in connection with the bumper for frictionally engaging the front wheels of the vehicle, and mechanism for operating said means and for moving the bumper in a rearward direction operated by the motor of the vehicle after initial movement has been imparted thereto by frontal contact on the bumper.

KARL KLEIN.